SEMICONDUCTOR BISTABLE CIRCUIT WITH INTEGRAL GATE
Filed Jan. 11, 1960
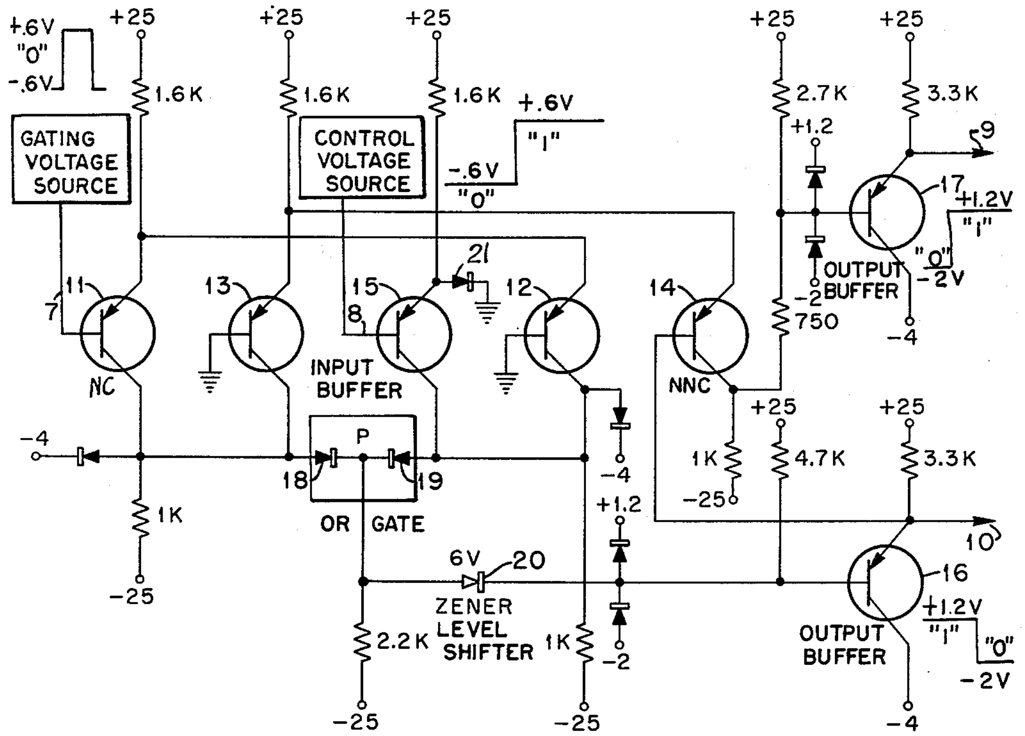
INVENTORS.
Wolfgang J. Poppelbaum
Neil E. Wiseman
BY
Roland A. Anderson
ATTORNEY 3,171,037

SEMICONDUCTOR BISTABLE CIRCUIT WITH INTEGRAL GATE

Wolfgang J. Poppelbaum, Champaign, Ill., and Neil E. Wiseman, Boreham Wood, England, assignors to the United States of America as represented by the United States Atomic Energy Commission Filed Jan. 11, 1960, Ser. No. 1,830
2 Claims. (Cl. 307—88.5)

The present invention relates to memory circuits, and more especially to an improved bistable flipflop circuit which includes its own gate circuit integral therewith.

Flipflop circuits are bistable storage elements with rapid access. They are classified generally as symmetrical, with two input terminals which accept similar input signals, and asymmetrical, with only a single input terminal. It is necessary in using flipflops to be able to sense the state which the circuit is in and to set and reset the state easily with some type of standard signals, as directed by some external information source. In calculating circuit costs, therefore, it is necessary to include with a flipflop the gating elements required to connect and disconnect the circuit from the external information source. For example, if a high impedance input is desired, four transistors are normally required to gate a conventional asymmetrical or symmetrical flipflop. In addition, the sensitivity of the resulting gate-plus-flipflop is undesirably low, about 1.2 volt gating and control signals being required to guarantee 0.6 volt signals at the flipflop inputs. Moreover, in gating between registers made up of memory circuits such as conventional flipflops, it has been proposed that push-pull gating signals be applied to the gates to speed up information transfer. Extra components are required, with conventional gate-flipflop circuits, however, increasing the cost of such gating.

With a knowledge of the shortcomings of memory circuits heretofore known, it is an object of this invention to provide a more sensitive memory circuit for use in computers, counters, and shifting registers, or wherever a flipflop circuit was heretofore used. Another object of the invention is to provide a circuit which is cheaper to build in that fewer switching elements are used, and which may be readily adapted to registers using push-pull gating. Another object is to provide a flipflop circuit integral with its gate. These and other objects of the invention will become apparent from the following description, when read in conjunction with the attached single figure, which illustrates a complete circuit diagram of the novel circuit.

In its preferred form, the invention comprises a flipflop circuit made up of first and second active semiconductor elements connected by means of an output from the first element to set the second and a single regenerative feedback loop from the second element to the input of the first, which loop is arranged to be opened temporarily, then closed. The circuit is arranged so that only if the control voltage to set the flipflop is received while the loop is temporarily open will the control voltage be able to drive the flipflop to the desired one of its two stable states. The feedback loop is then closed and the flipflop is trapped in that state to which it was set. The loop may be opened and closed electronically faster than manually by a switch, as for example by a diode network.

Referring now to the drawing an asymmetrical flipflop with an integral gate is shown. The gate is actually a part of the feedback loop of the flipflop, and closes the loop normally but opens it briefly upon receipt of a gating signal. The circuit includes first and third transistors 11, 12 connected to form a first difference amplifier, second and fourth transistors 13, 14 connected to form a second difference amplifier, an input buffer switching amplifier 15, and sixth and seventh output buffer transistors 16, 17. Each difference amplifier has a first input which is grounded, a second input, a first output connected to diode 18, and a second output. The composite signal derived from the two difference amplifiers and the switching amplifier is fed back through transistor 16 to the difference amplifier transistor 14. Logic is performed in the collectors. Additional input paths for the novel element above described can be provided with only three transistors per path.

Control voltages to be applied to terminal 8 direct the flipflop which state to assume. They are steady-state D.C. voltages of different levels, −0.6 and +0.6 volt, to indicate "0" or "1," respectively. The voltage normally existing at input 7 from the Gating Voltage Source is −0.6 volt, and the "gating" voltage is +0.6 volt. The gating voltage need be applied only briefly; i.e., long enough to allow the transistors 11, 12, 16, 14 and 17 to be switched successively to their new states, before it is removed, and serves to enable the flip flop to assume the new state indicated by the binary signal present on terminal 8. To better understand the operation of our novel circuit, the "zero" state is defined as that wherein output terminal 9 is at its lower voltage level, about −2 volts, while output 10 terminal is at its higher level, about +1.2 volts. The voltages listed are illustrative and approximate only, to aid circuit understanding. Transistor 14 is cut off by the +1.2 volt signal at its base, since the emitter is clamped to ground through the emitter-base junction of transistor 13. Thus transistor 13 conducts. Input 8 receives from the source of control signals a voltage of −0.6 volt for zero input, and fifth transistor 15 conducts, since its emitter is clamped to ground by a first diode 21. In the absence of a gating signal at point 7, the base of transistor 11 receives a normal signal of −0.6 volt, allowing that transistor to conduct, thus cutting off transistor 12. Current from both transistors 11 and 13 flows through second diode 18 and the 2.2K resistor, raising the potential of point P, which is the "OR" circuit output against the diode clamps to about −4 volts. The Zener diode 20 is a signal level shifting device. It is reverse biased, with its cathode clamped to +1.2 volts, and its anode and point P held at about −4 volts. The reverse breakdown serves to hold the level of the signal at the base of transistor 16 up, and thereby keeps it turned off.

The "one" state may be defined as that wherein output 9 is at its higher value, about 1.2 volts, while output 10 drops to its lower value, about −2 volts. Transistor 14 conducts due to the −2 volt signal at its base, and transistor 13 is cut off Because of the "one" input signal, +0.6 volt at point 8, transistor 15 is cut off by the diode clamp to its emitter. In the normal case with no gating signal, point 7 is at −0.6 volt, allowing transistor 11 to conduct, cutting off transistor 12. Transistor 11 is the only element conducting which is connected to point P. It alone will not conduct enough current to raise point P beyond about −9 volts. The cathode of Zener diode 20 cannot fall below +2 volts because of the diode clamp connected thereto. Since point P is about −9 volts, the Zener diode 20 is biased in the reverse direction and will break down, holding the voltage at the base of transistor 16 down against the −2 volt clamp, allowing it to conduct and its emitter to follow to about −2 volts.

To illustrate the effect of the gate, assume that the circuit is to be changed from "one" to "zero" state by changing the voltage at point 8 from +0.6 volt to −0.6 volt. As above described only transistors 11, 14, 16, 17 are conducting. The change of signal input causes transistor 15 to conduct, raising the potential at point P to above −9 volts. Then the gating signal of +0.6 volt is applied at point 7, cutting off transistor 11, thus forcing transistor 12 to conduct. Current through both transistors 15, 12 flows through third diode 19, raising point P to about −4 volts and the base of transistor 16 to +1.2 volts. The emitter and output 10 follow up to about 1.2 volts, cutting off transistor 14 and forcing transistor 13 to conduct. The potential at the base of transistor 17 drops because of the drop in the collector potential of transistor 14 when it is turned off, lowering the emitter and output 9 to about −2 volts. Thus the proper output voltages have been achieved. When the gating signal is removed, point 7 falls back to −0.6 volt, transistor 11 conducts, and transistor 12 is cut off. But the combined currents from conducting transistors 11, 13 through diode 18 are the same as those previously flowing through transistors 12, 15 through diode 19 and in like manner hold point P at −4 volts against the diode clamps, to retain the output signals as desired.

In summary, in the absence of a gate signal, the circuit input is effectively disconnected from the source of control voltages; that is, the flipflop cannot be reset to either state by merely changing the input to transistor 15, switching it on or off. The OR gate diodes 18, 19 will retain the controlling point P at the lowest voltage applied to the two diodes. Since the current through transistor 15 can drive point P no higher than −9 volts by itself, while the combined currents through transistors 11, 13 will drive point P to −9 volts if one is conducting, or −4 volts if both are conducting, it may be seen that transistor 15 cannot exert any control over point P as long as transistor 12 is not conducting. The feedback loop is normally closed, holding the flipflop as set; i.e., transistor 13 is held by the loop from point P through Zener diode 20, transistor 16, and transistor 14. Turning off transistor 11 breaks the above feedback loop in that transistor 13 no longer controls point P. Transistor 12 conducts, so that now diode 19 can receive either a −9 or −4 volt signal, while diode 18 can go no higher than −9 volts. Transistor 15 is then in control of point P and remains so as long as transistor 12 conducts, allowing the control signals at point 8 to set the flipflop. Thus it may be seen from the above description that a novel circuit element, wherein a gate is incorporated physically within a bistable memory circuit, has been achieved. It is to be understood that the voltages and component values given were merely by way of illustration, and should not be construed in a limiting sense.

We claim:

1. A memory circuit comprising first and second difference amplifier stages, said stages comprising first, second, third and fourth transistors, each of said transistors having base, emitter, and collector electrodes; means to supply a normal and a gating signal to base of said first transistor; means connecting the bases of said second and third transistors to ground; respective means connecting together the emitters of said first and third transistors and the emitters of said second and fourth transistors; a source of control signals; a fifth transistor provided with a base connected to receive said control signals, an emitter, and a collector; a first diode connecting said last named emitter to ground and poled to prevent a rise in emitter potential above ground; an "OR" circuit comprising second and third diodes having their cathodes connected together, their anodes connected respectively to the collectors of said first and second and of said third and fifth transistors, and an output lead connected to said connected cathodes; sixth and seventh output transistors provided with base, emitter, and collector electrodes and provided with output terminals at said emitters; a source of supply voltage connected to the collectors of said sixth and seventh transistors; means connecting the base of said sixth transistor to said "OR" circuit output lead; means connecting the emitter of said sixth transistor to the base of said fourth transistor to control the current therethrough responsive to the output of said "OR" circuit; means connecting the base of said seventh transistor to the collector of said fourth transistor to drive said seventh transistor therefrom.

2. A flipflop and integral gate circuit comprising:

(1) a first transistor provided with base, collector and emitter electrodes to form one side of said flipflop;

(2) respective sources of energizing potential connected to said electrodes;

(3) an "OR" gate having first and second inputs for receiving bias current signals and an output coupled to said base to set the state of said flipflop;

(4) a first difference amplifier forming the other side of said flipflop and having a grounded input, a second input coupled to said emitter, and an output connected to said first input of said "OR" circuit to furnish bias current thereto;

(5) a second transistor provided with a base to receive control signals to switch said second transistor off or on, a collector connected to said second input of said "OR" gate to furnish bias current thereto, and an emitter;

(6) a source of energizing potential coupled to said emitter;

(7) a second difference amplifier having a first grounded input, a second input, and first and second outputs connected respectively to said first and second inputs of said "OR" gate, to provide a bias current normally to said first input of said "OR" gate;

(8) a source of gating voltage connected to said second input of said second difference amplifier to switch the output bias current from said second difference amplifier temporarily to said second input of said "OR" gate, the magnitudes of said bias currents from the outputs of said difference amplifiers and said second transistor being substantially equal, thereby allowing said second transistor to control said "OR" gate only when said second difference amplifier furnishes bias current to said second "OR" gate input; and (9) first and second output terminals coupled to respective sides of said flipflop for indicating the state thereof.

References Cited by the Examiner

UNITED STATES PATENTS

| | | | |
|---|---|---|---|
| 2,879,412 | 3/59 | Hoge et al. | 307—88.5 |
| 2,924,788 | 2/60 | Maurushat | 307—88.5 |
| 2,928,010 | 3/60 | Campbell | 307—88.5 |
| 2,928,011 | 3/60 | Campbell | 307—88.5 |
| 2,933,621 | 4/60 | Poppelbaum | 307—88.5 |

ARTHUR GAUSS, *Primary Examiner.*

JOHN W. HUCKERT, HERMAN KARL SAALBACH, *Examiners.*